(12) United States Patent
Owerfeldt et al.

(10) Patent No.: US 12,034,564 B2
(45) Date of Patent: Jul. 9, 2024

(54) METHOD FOR OPERATING A VEHICLE ELECTRICAL SYSTEM, VEHICLE ELECTRICAL SYSTEM, AND COMPUTING SYSTEM

(71) Applicant: Robert Bosch GmbH, Stuttgart (DE)

(72) Inventors: Andre Owerfeldt, Markgroeningen (DE); Florian Bosch, Tuebingen (DE); Lambros Dalakuras, Leonberg (DE); Liem Dang, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 361 days.

(21) Appl. No.: 17/674,157

(22) Filed: Feb. 17, 2022

(65) Prior Publication Data
US 2022/0271969 A1   Aug. 25, 2022

(30) Foreign Application Priority Data
Feb. 24, 2021   (DE) ...................... 10 2021 104 421.9

(51) Int. Cl.
*H04L 12/40*   (2006.01)
*H04W 4/46*   (2018.01)

(52) U.S. Cl.
CPC ............... *H04L 12/40* (2013.01); *H04W 4/46* (2018.02); *H04L 2012/40215* (2013.01); *H04L 2012/40273* (2013.01)

(58) Field of Classification Search
CPC .. G05D 1/0088; G05D 1/0297; G05D 1/0276; G05D 1/0293; G05D 1/0027; G05D 1/0257; G05D 1/0246; G01C 21/3492; G01C 21/3664; G01C 21/3691; G01C 21/3815; G01C 21/005; G01C 21/30; G01C 21/3407; G01C 21/3602; G08G 1/202; G08G 1/22; G08G 1/07; G06Q 50/40; G06F 16/29; G06F 17/16; G06F 16/13; H03H 17/04; H03H 17/0211; G06V 20/56; G06V 20/20
See application file for complete search history.

(56) References Cited

U.S. PATENT DOCUMENTS

2016/0313730 A1*  10/2016  Ricci ...................... G08B 21/06
2018/0267537 A1*   9/2018  Kroop .................. G05D 1/0027
(Continued)

*Primary Examiner* — Jung Liu
(74) *Attorney, Agent, or Firm* — NORTON ROSE FULBRIGHT US LLP; Gerard A. Messina

(57) ABSTRACT

A method for operating a vehicle electrical system of a vehicle, configured in an architecture in which at least one central vehicle computer is assigned to a computational layer, intermediate control devices are assigned to an intermediate layer, and execution units are assigned to an execution layer. The at least one central vehicle computer contains datasets of at least the intermediate control devices linked to the relevant central vehicle computer. Each dataset interfaces are described for all execution units which are connected communicatively indirectly or directly via the second communication system with the relevant intermediate control device. In each central vehicle computer, an intermediate application is executed via which, using a relevant dataset, access is configured of applications executed on the relevant central vehicle computer via the relevant intermediate control device to execution units linked thereto.

12 Claims, 4 Drawing Sheets

(56) References Cited

U.S. PATENT DOCUMENTS

| | | | |
|---|---|---|---|
| 2019/0146500 A1* | 5/2019 | Yalla | H03H 17/04 |
| | | | 701/25 |
| 2020/0057452 A1* | 2/2020 | Beach | G05D 1/248 |
| 2022/0229954 A1* | 7/2022 | Mittal | G06F 30/20 |
| 2022/0253074 A1* | 8/2022 | Williams | G05D 1/0088 |
| 2022/0274521 A1* | 9/2022 | Kurokawa | B60Q 1/34 |
| 2022/0274523 A1* | 9/2022 | Kurokawa | H04L 12/413 |
| 2022/0274542 A1* | 9/2022 | Kurokawa | B60R 16/023 |
| 2022/0297635 A1* | 9/2022 | Fang | B60R 16/023 |
| 2024/0053771 A1* | 2/2024 | Zhu | G05D 1/101 |

\* cited by examiner

METHOD FOR OPERATING A VEHICLE ELECTRICAL SYSTEM, VEHICLE ELECTRICAL SYSTEM, AND COMPUTING SYSTEM

FIELD

The present invention relates to a method for operating a vehicle electrical system, a vehicle electrical system, a computing system, and a method for configuring a vehicle electrical system in a vehicle.

BACKGROUND INFORMATION

A modern vehicle comprises a wide range of functions, which are implemented through individual control devices and through sensors and actuators connected to them. Control devices in turn can be connected with one another in a data-transmitting or communicative manner in order to exchange data or information. The totality of the control devices, sensors, and actuators, and where applicable further components such as in particular communication links, is also referred to as a vehicle electrical system or vehicle data network, its structure or arrangement also being referred to also as E/E architecture.

SUMMARY

The present invention provides a method for operating a vehicle electrical system, a vehicle electrical system, a computing system, and a method for configuring a vehicle electrical system in a vehicle. Advantageous embodiments of the present invention are disclosed herein.

The present invention is concerned with a vehicle electrical system or with the E/E architecture in a vehicle, and in particular with communication between various units in this vehicle electrical system. Driven by cost-optimization, increasing complexity of the electronics in vehicles, and new possibilities created by technical progress, vehicle manufacturers in particular strive to optimize the E/E architecture. The use of a so-called zonal E/E architecture or zone architecture comes into consideration in order to save costs on the one hand by simplifying the cabling harness, and increase flexibility and scalability on the other by concentrating or centralizing software on so-called central vehicle computers (also referred to as 'vehicle computers'). In zonal E/E architecture, it is possible to link, e.g., sensors, actuators, 'intelligent' mechatronics or mechatronic units (so-called 'smart components', which are understood as mechanical units having their own computational logic and/or their own controller, such as, e.g., cooling mechatronics consisting of fan motor, fan end-stage, and fan microcontroller, or, e.g., the mechatronics of a transmission, which regulate gear changes), (smart) electronic control units (ECUs), i.e., control devices in the conventional sense, and other mechatronic units to one or several central vehicle computers via so-called zonal control devices in accordance with their geometrical position in the vehicle. The zonal control devices act here in particular as power and data distributors, whereas the actual logic or function is executed or computed, at least as far as possible, on the central vehicle computer.

The centralization of the software (comprising logic and function) typically involves the use of higher-performance computing units on the central vehicle computer—today's established systems, based on microcontrollers (μC), are extended in this class of devices through the addition of microprocessors (μP). The operating systems running on them (e.g., POSIX-based operating systems) make possible a so-called service-oriented architecture (SOA) which allows efficient and rapid development of functions.

Up to now, the introduction of new functions into a distributed system such as a vehicle electrical system has normally required adapting the software to all the participating control devices. The objectives of faster market introduction of vehicle functions and of extending or supplementing vehicle functions in the field, can only be efficiently realized if the participant who implements the logic of the function—in the aforementioned zonal architecture, this is a central vehicle computer—has available to it full access to the vehicle's peripheral devices, more specifically to its sensors and actuators.

A high level of reuse (or as universal a use as possible) of the software functions on central vehicle computers requires the relevant applications (which provide the software functions) to be decoupled from the vehicle hardware being used. Decoupling using an approach based on a service-oriented architecture (SOA) (or 'service-based approach') in central vehicle computers requires a conversion of the signal-based information of the peripheral devices, more specifically the sensors and actuators, to service-based interfaces. Such a conversion should be possible without program code of the zonal control devices and underlying components (the execution units) being necessary in order to achieve the aforementioned decoupling.

In this process, it is desirable to make new vehicle functions possible solely through an update of software functions on vehicle computers, without an update of the software of the zonal control devices or downstream components (execution units) being necessary.

As mentioned, a zonal architecture underlies the vehicle electrical system or the E/E architecture of a vehicle, as it is used in the context of the present invention. This zonal architecture comprises three layers: A computational layer, a zonal layer, and an execution or embedded layer. The central vehicle computer is provided in the computational layer. The use of several such central vehicle computers is also possible, all of which are then assigned accordingly to the computational layer. It is typical and also preferable to link the central vehicle computer (in particular wirelessly) to a vehicle-external or vehicle-separate computing unit such as a remote computing system or a server ('cloud'), over which various functions or services or software updates may be provided. In the case of several central vehicle computers, linking one of them to the vehicle-separate computing unit may be sufficient. This vehicle-separate computing unit may then likewise be assigned to the computational layer.

In accordance with an example embodiment of the present invention, in the zonal layer, there are provided (in the generic sense) zonal control devices, wherein typically several zonal control devices are present, even though in principle the zonal architecture is also usable with just one zonal control device. In the execution layer there are provided (in the generic sense) execution units, wherein typically several execution units are present per zonal control device, even though in principle the zonal architecture is also usable with just one execution unit in total or one execution unit per zonal control device.

The zonal control devices—these may be, as also elucidated hereinunder in further detail, relatively simple computing systems or computing units—serve in particular for geometrical or spatial partitioning in the vehicle. For example, four zonal control devices may be provided, one each for the front, rear, left, and right in the vehicle (cf.

hereto also figures and their descriptions). Execution units are to be understood in particular as sensors, actuators, so-called smart components (intelligent mechatronics) or (smart) electronic control units (ECUs), i.e. control devices in the conventional sense, and other mechatronic units which are located at the lowest layer and are responsible for (direct) execution of actions or measurements. Due to the assigning of the execution units to one zonal control device in each case, the individual execution units may accordingly also be assigned to a zone such as 'front' or 'rear'. For example, all the control devices arranged in the engine compartment may be assigned to the 'front' zone.

In accordance with an example embodiment of the present invention, the zonal control devices are each connected communicatively with the central vehicle computer (the computational layer) using a first communication system. The first communication system that may be considered here would be e.g. Ethernet or some other broadband communication system. Where several central vehicle computers are involved, each zonal control device may be connected with (just) one of these central vehicle computers. The execution units are each connected communicatively indirectly or directly, via a second communication system such as, e.g., a communication bus, with the zonal control device assigned to them. The second communication system communication bus that may be considered here would be, e.g., a CAN or LIN bus. Where applicable, different execution units may also be linked to the same zonal control device via different communication buses. Individual execution units may be linked directly to the assigned zonal control device, which applies in particular to control devices or smart or intelligent sensors and actuators. Likewise, however, an execution unit may be linked indirectly to the zonal control device, and then, e.g., via such a control device. This applies then in particular to simple sensors and actuators. For all communication systems, 'communicative linking' shall be understood in particular in the sense that data or information may be exchanged, in particular digitally (but in the case of simple sensors, switches, or actuators, also in an analog manner where applicable), likewise however also, e.g., simple voltage and/or current values (which are obtained e.g. by changing the resistance of a temperature sensor).

Besides this zonal architecture and the aforementioned communication links, there is further provided a special configuration of zonal control devices and central vehicle computers, which are used in the operation of such a vehicle electrical system or whereby such a vehicle electrical system with its units is configured. In terms of the present invention, a vehicle electrical system comprises at least the central vehicle computers, central control devices, execution units mentioned in the context of the zonal architecture (thus in particular at least one of each), and the respective communication systems, in particular insofar as they are present, e.g., in a vehicle.

As is evident from the following explanations, the present invention functions not only with such a zonal architecture; an architecture having the aforementioned three layers is also sufficient. Although (geometrical) partitioning by zones is advantageous, it is not absolutely necessary. In this sense, instead of zonal control devices the discussion below shall also refer to intermediate control devices (which are then assigned to an intermediate layer). Accordingly, likewise the utilized architecture does not necessarily have to be a zonal architecture.

In accordance with an example embodiment of the present invention, for each intermediate zonal control device, there is provided here a description file in which interfaces are described for all execution units connected communicatively indirectly or directly via the second communication system with the relevant intermediate control device. Such a description file is in particular a machine-readable description of these interfaces. For each central vehicle computer there are then created—e.g. in the context of a configuration—datasets of at least the intermediate control devices linked to the relevant central vehicle computer. In other words, the central vehicle computer is configured on the basis of the description files such that subsequently, via the interfaces, the relevant items of information are present in the central vehicle computer—precisely in the datasets. To this end, these description files may, e.g., be stored on the relevant intermediate control devices and access to them is allowed. It is also possible that the description files are loaded onto the relevant central vehicle computer and are then held available there. Likewise, the description files may be provided via the aforementioned vehicle-separate computing unit and retrieved by the central vehicle computer as needed, which allows for a simple adaptation of the datasets. The description files may also be used merely for the configuration or for the creation of the program (incl. the datasets) of the central vehicle computer.

These description files may be created and provided, e.g., by the manufacturers of the relevant intermediate control devices. The administration and provision of the description files does not necessarily, however, have to be carried out by the manufacturer or supplier of the intermediate control device. A supplied ecosystem consisting of relevant tools and SW products may also allow vehicle manufacturers to perform themselves, for example, expansions of the description files of intermediate control devices.

In accordance with an example embodiment of the present invention, a description file of an intermediate control device comprises for example, inter alia, the description of the interface of inputs and outputs connected directly to the intermediate control device and of the communication interface of components connected, for example, using sub-bus systems, that is, the execution units connected communicatively indirectly or directly via the second communication system with the relevant intermediate control device. Existing description formats of the periphery connected to the intermediate control device, e.g., widely-used description formats such as the ODX format which is widely used for workshop diagnosis, may be reused for the description files and supplemented by additional information such as e.g. sequence control of the workshop diagnosis in the OTX format. Further meta-information relating to the connected periphery, e.g., information concerning the operational range of an output, may likewise form a component of the description file. Thereby all the information is available which is necessary in order to be able to read out or actuate every execution unit connected to the zonal control device.

Furthermore, in every central vehicle computer there is executed an intermediate application—referred to as 'middleware', which in particular is configurable—via which, by way of a relevant dataset (i.e., the relevant information relating to the available interfaces), access from applications (software) executed on the relevant central vehicle computer to execution units linked thereto, via the relevant intermediate control device, is installed or enabled. This allows for the linking of the applications to the available hardware of the vehicle.

In accordance with an example embodiment of the present invention, preferably, there are provided by the intermediate application on the relevant central vehicle computer both a signal-based interface and a service-based interface, which for example may then be used as needed. Whereas data or information are provided via a signal-based interface as soon as available, as for example is necessary for hard real time requirements, the data or information are provided as services via a service-based interface (or in a service-oriented architecture), i.e. every computing unit (here every zonal control device or every execution unit, but equally also the central vehicle computer or there the microprocessor or a program running on it) may subscribe to the required services and thereupon has the data sent to it.

In accordance with an example embodiment of the present invention, preferably there is also provided between a central vehicle computer and an intermediate control device a communication interface over which information may be exchanged via at least one communication paradigm. The at least one communication paradigm comprises e.g. a gateway paradigm (or tunneling paradigm) in which data based on the second communication system (i.e., which are sent from a execution unit to the intermediate control device) are transformed into corresponding data based on the first communication system (i.e. which are sent from the intermediate control device to a central vehicle computer) or vice versa. A (content-related) modification of the data thus does not take place here, merely a (formal) adaptation to the other communication system. Communication paradigms should be understood here in particular as various processing methods and/or protocols of communication via the same medium (here in particular Ethernet), e.g. gateway/tunneling as mentioned, or also for example cyclic block transfer of sensor/actuator information, routing based on existing diagnostic transport protocols, or Ethernet routing (which may take place purely in hardware, switch- or bridge-based, on the zonal control device).

The applications executed on the central vehicle computers then access the communication interface in particular. The applications may comprise or provide vehicle functions which are represented at the top layer (namely on the central vehicle computer) as software components (SWCs) or applications (apps). These then access the communication interface. The decoupling takes place using the aforementioned intermediate application or middleware, comprising e.g. the signal-based interface (signal dispatcher) and the service-based interface, which are parameterized by way of the description files or datasets of the intermediate control devices.

An main difference and also advantage of the proposed concepts compared with previous configurations lies in providing the central vehicle computer and the applications running on it with access to all peripheral device, specifically sensors and actuators (the execution units), installed in the vehicle. An application does not have to be concerned here with the question over which intermediate control device the access takes place and what it looks like in the specific implementation. The interplay between the configurable intermediate application (middleware) and the datasets (description files) of the intermediate control devices makes this abstraction possible.

In addition, the proposed concepts offer the option of adding or replacing components below the intermediate control devices, i.e., execution units, or modifying their parameters and allowing access thereto from the central vehicle computers via the relevant zonal control device, without an adaptation of the program code of the intermediate control device being needed for this purpose. An adaptation or parameterization is necessary only in the datasets of the intermediate control devices, which however—as mentioned—are readily adaptable. Corresponding description files are readily accessible and may also be provided, e.g., via the vehicle-separate computing unit. The datasets, i.e., the configuration of the central vehicle computer, may then be adapted thereby.

In addition to a method for operating such a vehicle electrical system in a vehicle, the present invention also relates to such a vehicle electrical system, to a computing system for use as a central vehicle computer in such a vehicle electrical system, and to a method for configuring such a vehicle electrical system in a vehicle. Preferably during the configuration process, when an execution unit is replaced or added, the dataset of the relevant intermediate control device to which the execution unit is to be connected, is adapted. Preferably also during the configuration process, when an application which is to be executed on a central vehicle computer is replaced or added, the intermediate application of the relevant central vehicle computers is adapted.

In order to avoid repetitions, for further embodiments and advantages of the vehicle electrical system, computing system, and configuration method, reference is made to the above explanations which apply here mutatis mutandis.

Further advantages and embodiments of the present invention are shown by the description herein and the figures.

The present invention is depicted schematically in the figures on the basis of an example embodiment and is described hereinunder by reference to the figures.

DETAILED DESCRIPTION OF EXAMPLE EMBODIMENTS

Figure 1:
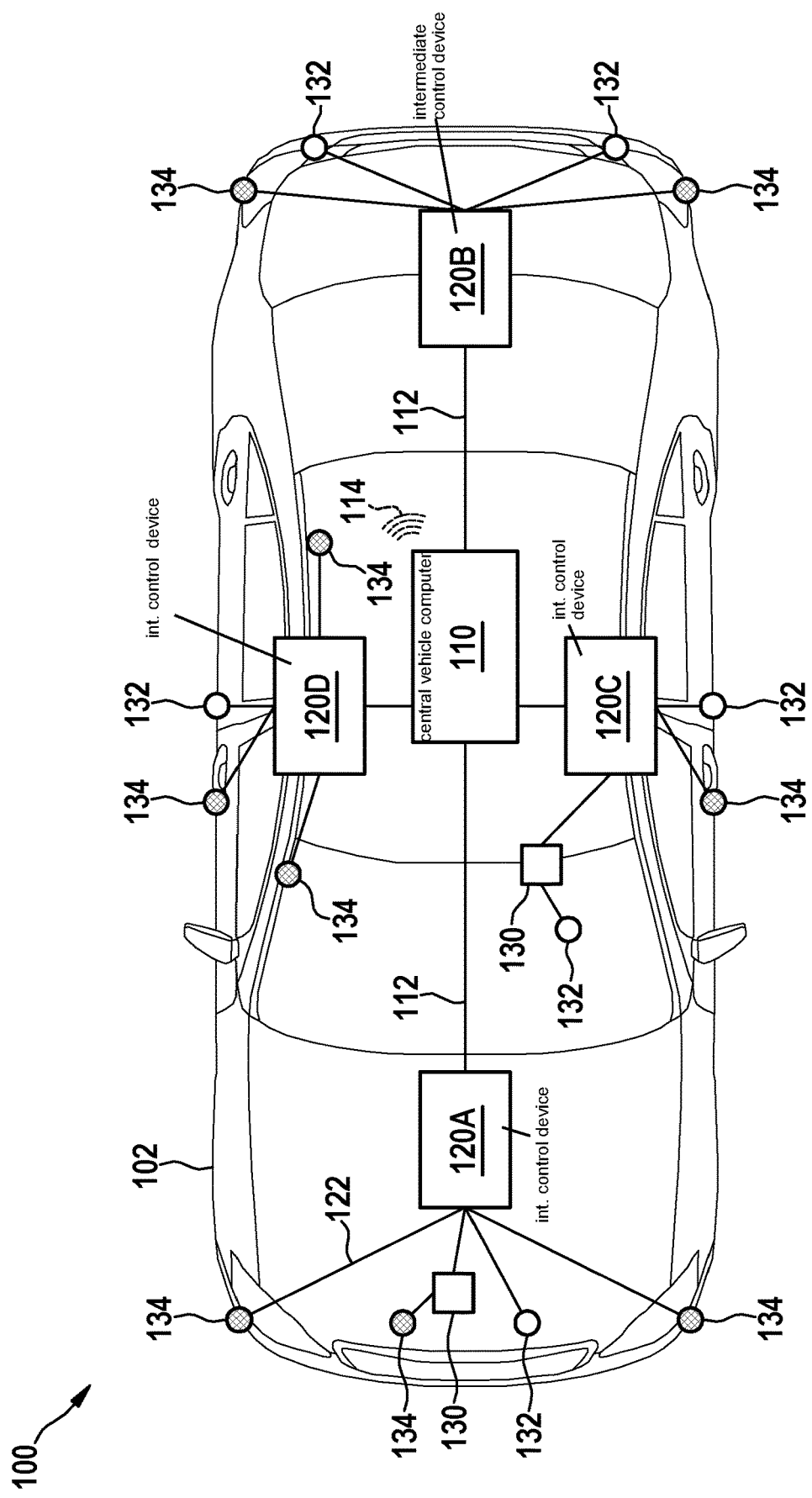
FIG. 1 shows schematically a vehicle electrical system according to the present invention in a preferred example embodiment in a vehicle.

FIG. 1 depicts schematically a vehicle electrical system 100 according to the present invention in a preferred embodiment in a vehicle 102, on the basis of which the E/E architecture or the distribution of the individual units or components of the vehicle electrical system are to be elucidated. The vehicle electrical system 100 comprises, for example, a central vehicle computer 110, four intermediate control devices 120A, 120B, 120C, 120D configured (or used) as zonal control devices, and several execution units which here comprise control devices 120, intelligent mechatronic units 132, and actuators and sensors 134 (no distinction shall be made here between actuators and sensors).

By way of example, the zonal control devices 120A, 120B, 120C, 120D are each assigned to one zone out of 'front', 'rear', 'left', and 'right' and are each linked communicatively via a first communication system 112, e.g. Ethernet, to the central vehicle computer 110, which allows for communication of each of the zonal control devices with the central vehicle computer 110. In addition, the central vehicle computer 110 includes for example a wireless communication link 114 (or an appropriate communication module) in order to be able to communicate e.g. with a vehicle-separate computing unit ('cloud'), as shall be elucidated below in further detail. However, it is also possible that the central vehicle computer 110 is merely linked to such a communication module.

The execution units 130, 132, 134 are each assigned to one of the zonal control devices and are linked communicatively indirectly or directly to the relevant zonal control device via a second communication link 122, such as e.g. a CAN or LIN bus. For example, the control device 130 assigned to the zonal control device 120A is linked directly to the zonal control device, one of the sensors/actuators 134 in contrast is linked indirectly, namely via the control device 130; this sensor/actuator 134 in particular being linked directly to the control device 130. Other sensors/actuators 134 are e.g. also linked directly to the zonal control device, and the same applies to the intelligent mechatronic units 132.

The second communication systems 122 for linking the execution units to the zonal control devices or where applicable to each other, do not necessarily have to be all identical; possibly, they may be differentiated by the type of execution unit. Thus, simpler sensors are linked e.g. only via LIN, somewhat more complex control devices e.g. via CAN. The zonal control devices comprise, however, appropriate interfaces.

The concrete nature or functionality of the execution units 130, 132, 134 is immaterial for the present invention; for example, the execution units 130, 132, 134, which are assigned to the zonal control device 120A and thus to the 'front' zone, may comprise e.g. lights or actuators for windshield wipers or similar. The like applies to the zonal control device 120B or the 'rear' zone. The execution units assigned to the zonal control devices 120C, 120D, or the 'left' and 'right' zones, respectively, may involve e.g. switches and actuators for window-lifting mechanisms. At this point, it should be mentioned again that this vehicle electrical system is purely and solely an example, and is meant to serve for elucidating the present invention.

The depicted vehicle electrical system 100, however, shows clearly that by using the zonal control devices, a systematic assignment or allocation of the individual execution units by geometrical zones, having only one central vehicle computer (or where applicable, a few central vehicle computers), is possible, whereby the total (cumulative) length of cables for the vehicle electrical system may sometimes be significantly reduced compared with a conventional E/E architecture.

It should be mentioned at this point that the above concerns in particular the communication systems or communication media. Of course, the individual units also require an energy or current supply, which shall not be discussed here further.

Figure 2:
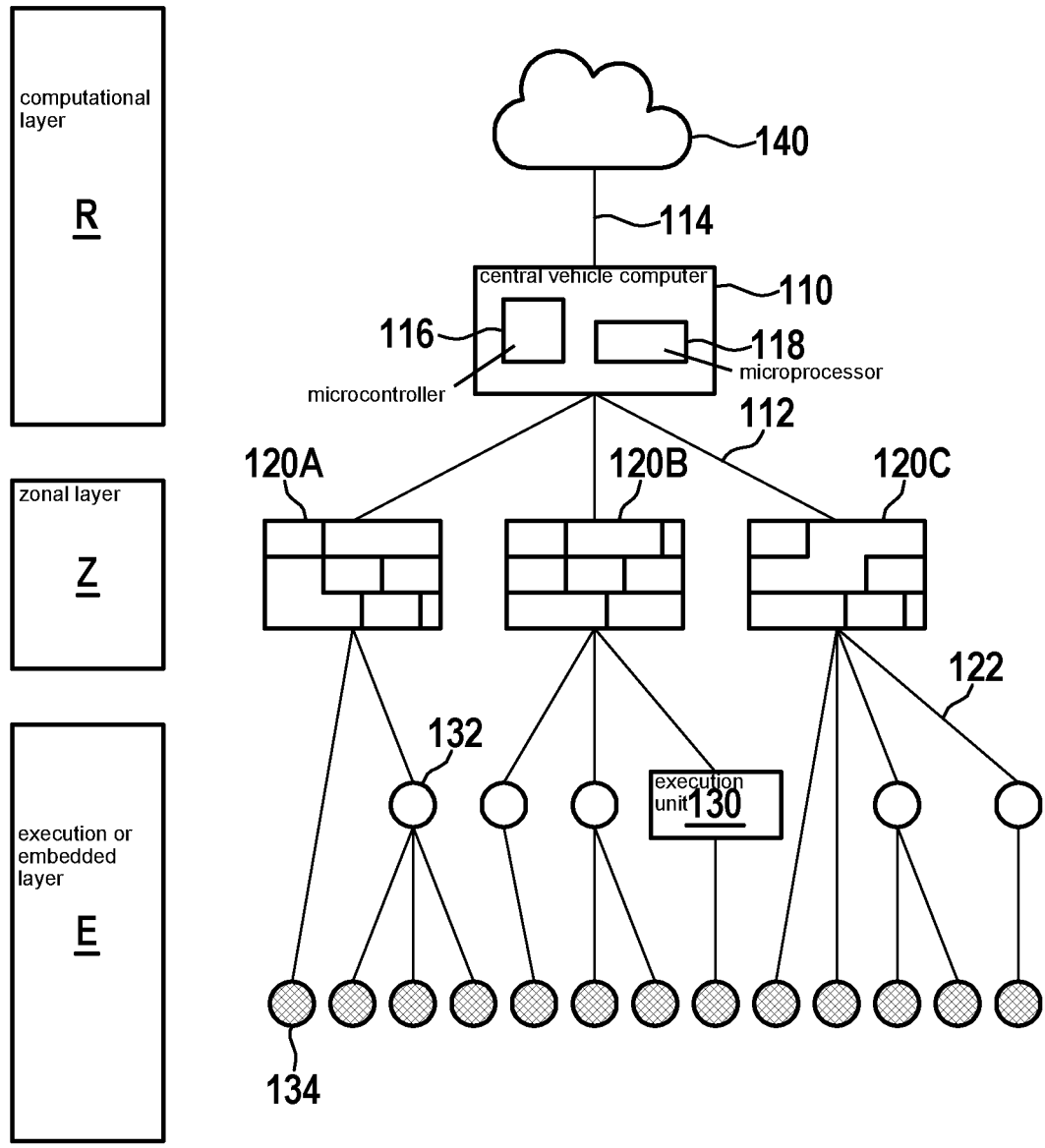
FIG. 2 shows schematically a zonal architecture of a vehicle electrical system for elucidating the present invention.

FIG. 2 depicts schematically a zonal architecture of a vehicle electrical system for elucidating the present invention. The vehicle electrical system shown here is comparable to the vehicle electrical system 100 of FIG. 1, albeit having a somewhat different number of individual units; the labels, however, corresponding to those of FIG. 1. Thus for example, only the three zonal control devices 120A, 120B, 120C are shown, to each of which execution units are assigned whose number may possibly differ from that of FIG. 1. This, however, does not impact the functionality of the present invention.

As already mentioned, within the scope of the present invention, a zonal architecture is used comprising three layers to which the individual units are assigned. The central vehicle computer 110, here by way of example shown having a microcontroller 116 and a microprocessor 118, is assigned to the computational layer R. Likewise there is shown a vehicle-separate computing unit 140 (this is e.g. a central server or high-performance computer which provides a memory and computing power, situated remotely from the vehicle), to which the central vehicle computer is linked via the wireless communication link 114. The vehicle-separate computing unit 140 is likewise assigned to the computational layer R.

The zonal control devices 120A, 120B, 120C are assigned to the zonal layer Z and the execution units 130, 132, 134 are assigned to the execution or embedded layer E. Within the execution layer E, the control devices 130 and the intelligent mechatronic units 132 are arranged at an intermediate stage above the sensors/actuators 134 which, however, does not impact the functionality of the present invention.

The communication systems and the communicative linking already elucidated by reference to FIG. 1 yield a communication concept, according to which communication between an execution unit (in the execution layer E) and the central vehicle computer (in the computational layer R) always or only occurs via a zonal control device (in the zonal layer Z). Communication between two zonal control devices in turn always or only occurs via the computational layer R. The zonal control devices themselves serve thereby only as a kind of gateway or tunnel. Every zonal control device outputs incoming data without changing their content, at most a formal adaptation being performed to the other communication system, e.g. from LIN to Ethernet or Ethernet to CAN, or encapsulation.

Figure 3:
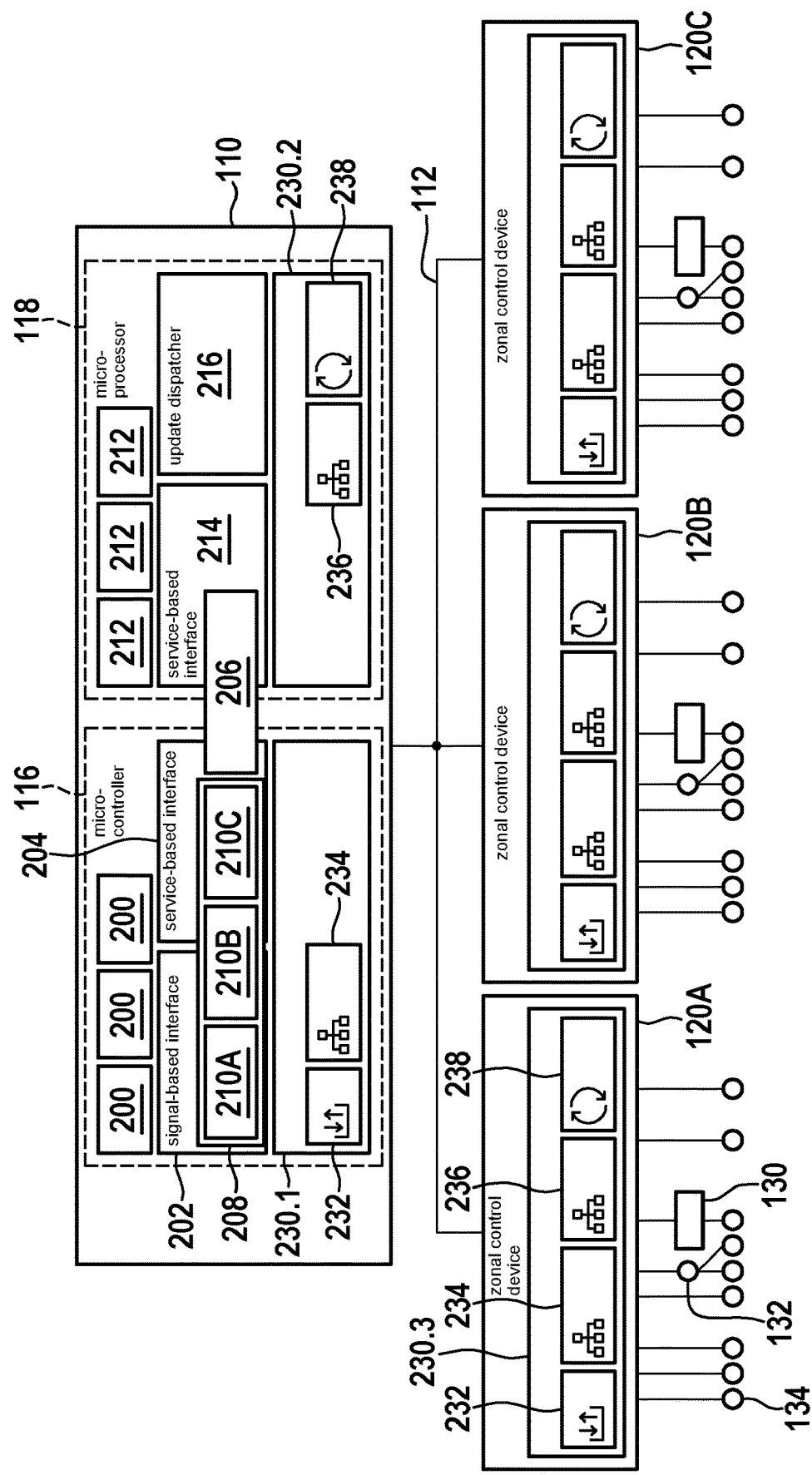
FIG. 3 shows schematically part of a vehicle electrical system for elucidating the present invention.

FIG. 3 depicts schematically part of a vehicle electrical system in further detail for elucidating the present invention. In particular, the central vehicle computer 110 and the zonal control devices 120A, 120B, 120C from FIG. 2 are shown here in further detail, on the basis of which the concept proposed within the scope of the present invention of the configuration of zonal control devices and their integration into the central vehicle computer is to be elucidated. The execution units assigned to the zonal control devices may possibly differ in their number from the situations shown in FIGS. 1 and 2. This, however, does not impact the functionality of the present invention.

By way of example, three applications in the form of software components (SWCs) 200 are to run here on the microcontroller 116 of the central vehicle computer, and furthermore a signal-based interface 202 (or signal dispatcher) and a service-based interface 204 (service interface) are provided. By way of example, three applications (apps) 212 are to run here on the microprocessor 118 of the central vehicle computer, while furthermore a service-based interface 214 (service interface) and an update dispatcher 216 (a unit which is provided for software updates and their distribution) are provided. The service-based interfaces 204 and 214 together provide a service-oriented architecture 206. What is essential here is a signal-to-service conversion; this may preferably take place on the side of the microcontroller (then at interface 204) or on the side of the microprocessor (then at interface 214). On the respectively other side, in particular only a link (connection) to the signal or to the application is then provided.

Furthermore, by way of example, the datasets 210A, 210B, and 210C are provided on microcontroller 216, which belong to the three depicted zonal control devices 120A, 120B, and 120C, which were generated on the basis of corresponding description files (i.e. the datasets are created through the configuration) and to which an intermediate application or middleware, labelled here 208 by way of example, has access. Likewise, the datasets may (additionally) be held available on the microprocessor 118 and/or be utilized for producing the appropriate configuration. For example, parts may be described which are communicated directly by the microprocessor 118 as updates. As mentioned, the interfaces of the zonal control devices to the execution units linked or linkable thereto are described in the datasets. The central vehicle computer may thereby access the execution units via the zonal control devices.

Furthermore, between the central vehicle computer 110 and the zonal control devices there is provided a communication interface which on the part of the central vehicle computer 110 is provided in two components. One component 230.1 is executed on the microcontroller 216 and covers incoming and outgoing data 232 (input/output) and a gateway 234 for the second communication system, i.e. for example CAN, LIN. The other component 230.2 in contrast is executed on the microprocessor 218 and covers a switch function 236 for the first communication system, e.g. Ethernet, and serves for updates 238.

On each of the zonal control devices 120A, 120B, 120C, a counterpart 230.3 of the communication interface is provided, each of which covers all functions. In this way, the central vehicle computer has access to the execution units which are linked to the zonal control devices, and may e.g. receive data from there, transmit data there, or may provide software updates for these (via the zonal control device as a buffer).

Figure 4:
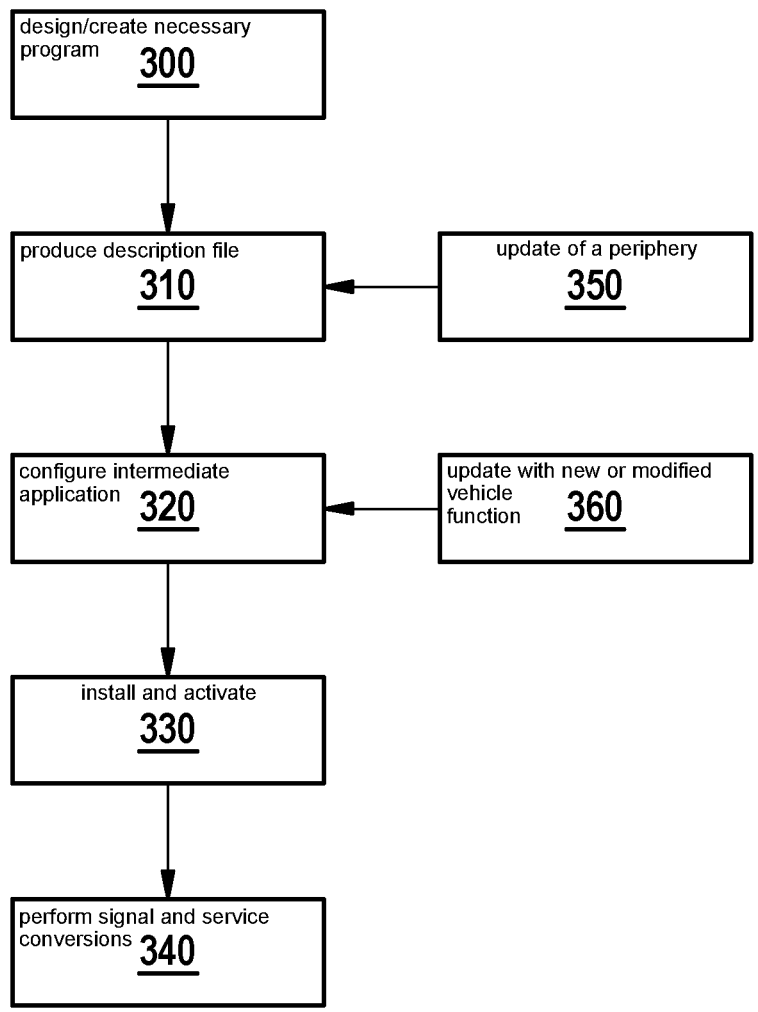
FIG. 4 shows schematically a sequence of a method according to the present invention in a preferred specific embodiment.

FIG. 4 depicts schematically a sequence of a method according to the present invention in a preferred specific embodiment, comprising the configuration of a vehicle electrical system in a vehicle.

In a step 300, a manufacturer of a zonal control device may first design it, namely in accordance with the periphery (the execution units) to be connected or already connected in the vehicle, and create the necessary program in order to be able to interact with the periphery.

Based on the items of information of the program (these may be e.g. acquired through an automated process during the generation of the program) and on further description files which the connected periphery delivers (e.g. communication interface of the connected periphery in Autosar ARXML or Vector DBC standard), the manufacturer of the zonal control device, for example, creates or produces in step 310 a description file valid for the zonal control device, which it provides to the vehicle manufacturer.

In step 320, the vehicle manufacturer then configures the intermediate application (middleware) on the central vehicle computer (or indeed on several central vehicle computers, if applicable), using the description file. In other words, the datasets are created (i.e. the intermediate application has at its disposal—via the datasets—the information concerning the interfaces on the zonal control devices). The applications (SWCs and apps) running thereon are connected with the relevant information of the zone (to which a zonal control device is assigned). The link may be signal-based as well as service-based, the respective interfaces being available here, as mentioned. Information such as data type, conversion, etc. is typically relevant for a link. Where applicable, further parameters of the described interface are also to be defined (e.g. frequency of a PWM signal), if these are offered. In the case of a service-based link, the configuration describes e.g. in addition the conversion from signal to service. The configuration may e.g. take place using tools which likewise are provided by the manufacturer of the zonal control device. The configuration supports, for example, both pre-compile configurations and post-build configurations.

Once the configuration (that is, the intermediate application or middleware) has been installed on the central vehicle computer and activated in step 330, in step 340, the signal conversion and service conversion of the signal-based information of the zonal control devices is performed at run time (i.e. during operation) on the central vehicle computer in accordance with the configuration in the middleware. The communication takes place between the zonal control device and the central vehicle computer via the described communication interface.

In addition, by way of example, two scenarios of a subsequent update are depicted. In step 350, an update of a periphery (execution unit) connected to the zonal control device is shown, e.g. the replacement of a connected smart actuator by a product of another manufacturer or just the simple extension of a connected periphery. Modifications need not impact the program code of the zonal control device, since the latter plays the part of a transparent data distributor, as was elucidated in detail. The modification may therefore take place solely via an update of the description file and then—via appropriate configuration—of the dataset and the corresponding adaptations on the part of the central vehicle computer.

An update is shown in step 360, in which a new or modified vehicle function is installed as an SWC or app on the central vehicle computer (and which is then to be executed there later). Since the description of the connected sensors and actuators of the vehicle is already available on the central vehicle computer in the form of the dataset, merely an adaptation of the configuration of the middleware on the central vehicle computer is required.

The invention claimed is:

1. A method for operating a vehicle electrical system of a vehicle, the vehicle electrical system including at least one central vehicle computer, at least one intermediate control device, and at least one execution unit, wherein at least one of the at least one execution unit is assigned to each of the at least one intermediate control device, the vehicle electrical system being configured in an architecture in which the at least one central vehicle computer is assigned to a computational layer, the at least one intermediate control device is assigned to an intermediate layer, and the at least one execution unit is assigned to an execution layer, wherein the at least one intermediate control device is connected communicatively via a first communication system with the at least one central vehicle computer, and wherein the at least one execution unit is connected communicatively indirectly or directly via a second communication system with the intermediate control device assigned to it, the method comprising:

providing, on each of the at least one central vehicle computer, datasets of at least the intermediate control devices linked to the central vehicle computer, wherein in each dataset, interfaces are described for each of the execution units which are connected communicatively indirectly or directly via the second communication system with the intermediate control device associated with execution unit; and executing, in the at least one central vehicle computer, an intermediate application via which, using a relevant one of the datasets, access is configured of applications executed on the central vehicle computer via a relevant one of the intermediate control devices to the execution units linked to the relevant one of the intermediate devices.

2. The method according to claim 1, wherein through the intermediate application, both a signal-based interface and a service-based interface are provided on the central vehicle computer.

3. The method according to claim 1, wherein between the central vehicle computer and the at least one intermediate control device, a communication interface is provided over which information may be exchanged via at least one communication paradigm.

4. The method according to claim 3, wherein the at least one communication paradigm includes a gateway paradigm in which data based on the second communication system are converted into corresponding data based on the first communication system or vice versa.

5. The method according to claim 3, wherein the applications executed on the at least one central vehicle computer access the communication interface.

6. A vehicle electrical system for a vehicle, comprising:
at least one central vehicle computer;
at least one intermediate control device; and
at least one execution unit, wherein at least one of the at least one execution unit is assigned to each of the at least one intermediate control device;
wherein the vehicle electrical system is configured in an architecture in which the at least one central vehicle computer is assigned to a computational layer, the at least one intermediate control device is assigned to an intermediate layer, and the at least one execution unit is assigned to an execution layer, wherein the at least one intermediate control device is connected communicatively using a first communication system with the at least one central vehicle computer, and wherein the at least one execution unit is connected communicatively indirectly or directly via a second communication system with the intermediate control device assigned to it;
wherein the vehicle electrical system is installed in such a way that each of the at least one central vehicle computer contains datasets of at least the intermediate control devices linked to the central vehicle computer, wherein in each of the datasets, interfaces are described for each of the execution units which are connected communicatively indirectly or directly via the second communication system with the intermediate control device associated with execution unit, and
wherein the at least one central vehicle computer is configured in such a way that during operation, an intermediate application is executed on it via which, using a relevant one of the datasets, access is configured of applications executed on the central vehicle computer via a relevant one of the at least one intermediate control device to the execution units linked to it.

7. The vehicle electrical system according to claim 6, wherein through the intermediate application, both a signal-based interface and a service-based interface are provided on the central vehicle computer.

8. A computing system for use as a central vehicle computer in a vehicle electrical system for a vehicle, the vehicle electrical system including at least one central vehicle computer, at least one intermediate control device, and at least one execution unit, wherein at least one execution unit is assigned to each intermediate control device, wherein the vehicle electrical system is configured in an architecture in which the at least one central vehicle computer is assigned to a computational layer, the at least one intermediate control device is assigned to an intermediate layer, and the at least one execution unit is assigned to an execution layer, wherein the at least one intermediate control device is connected communicatively using a first communication system with the at least one central vehicle computer, and wherein the at least one execution unit is connected communicatively indirectly or directly via a second communication system with the intermediate control device assigned to it;
wherein the at least one central vehicle computer contains datasets of at least the intermediate control devices which are to be linked to the central vehicle computer, in each of which datasets interfaces are described for each of the execution units which are to be connected communicatively indirectly or directly via the second communication system with the intermediate control device associated with execution unit, and
wherein the at least one central vehicle computer is configured in such a way that during operation, an intermediate application is executed on it via which, using a relevant one of the datasets, access is configured of applications executed on the central vehicle computer via a relevant one of the intermediate control devices to execution units linked to it.

9. A method for configuring a vehicle electrical system in a vehicle, the vehicle electrical system including at least one central vehicle computer, at least one intermediate control device, and at least one execution unit, wherein at least one execution unit is assigned to each of the at least one intermediate control device, the method comprising:
configuring the vehicle electrical system in an architecture in which the at least one central vehicle computer is assigned to a computational layer the at least one intermediate control device is assigned to an intermediate layer, and the at least one execution unit is assigned to an execution layer, wherein the at least one intermediate control device is connected communicatively using a first communication system with the at least one central vehicle computer, and wherein the at least one execution unit is connected communicatively indirectly or directly via a second communication system with the intermediate control device assigned to it;
creating, for each of the at least one intermediate control device, a description file in which interfaces are described for all execution units which are connected communicatively indirectly or directly via the second communication system with the intermediate control device;
creating, for each of the at least one central vehicle computer, datasets of at least the intermediate control devices linked to the central vehicle computer, from the description files; and
configuring the at least one central vehicle computer in such a way that during operation, an intermediate application, is executed on it via which, using a relevant one of the datasets, access is configured of applications executed on the central vehicle computer via a relevant one of the at least one intermediate control device to execution units linked to it.

10. The method according to claim 9, wherein when an execution unit is replaced or added, the dataset of a relevant one of the intermediate control device, to which the replacement or added execution unit is to be connected, is adapted.

11. The method according to claim 9, wherein when an application which is to be executed on a central vehicle computer is replaced or added, the intermediate application of a relevant one of the at least one central vehicle computer is adapted.

12. The method according to claim 9, wherein through the intermediate application, both a signal-based interface and a service-based interface are provided on the central vehicle computer.

* * * * *